(12) United States Patent
Murakami et al.

(10) Patent No.: US 6,902,502 B2
(45) Date of Patent: Jun. 7, 2005

(54) CONTINUOUSLY VARIABLE TRANSMISSION

(75) Inventors: Hisayasu Murakami, Ikeda (JP); Yasuyuki Temma, Ikeda (JP); Masahiro Tanaka, Ikeda (JP)

(73) Assignee: Daihatsu Motor Co., Ltd., Ikeda (JP)

( * ) Notice: Subject to any disclaimer, the term of this patent is extended or adjusted under 35 U.S.C. 154(b) by 24 days.

(21) Appl. No.: 10/344,691

(22) PCT Filed: Jun. 19, 2002

(86) PCT No.: PCT/JP02/06128

§ 371 (c)(1),
(2), (4) Date: Feb. 24, 2003

(87) PCT Pub. No.: WO03/023255

PCT Pub. Date: Mar. 20, 2003

(65) Prior Publication Data

US 2004/0102267 A1 May 27, 2004

(30) Foreign Application Priority Data

| Sep. 6, 2001 | (JP) | 2001-269638 |
| Sep. 27, 2001 | (JP) | 2001-295240 |
| Oct. 15, 2001 | (JP) | 2001-316138 |
| Oct. 22, 2001 | (JP) | 2001-324133 |

(51) Int. Cl.$^7$ ............................ F16H 9/16; F16H 35/08; F16H 55/56
(52) U.S. Cl. ............................ 474/23; 474/8; 475/210; 74/745
(58) Field of Search ................. 474/8–13, 18, 474/28, 29–31, 49, 900, 23; 475/208–210, 321, 322

(56) References Cited

U.S. PATENT DOCUMENTS

| 4,735,598 A | 4/1988 | Moroto et al. |
| 5,057,061 A | * 10/1991 | Sakakibara et al. ......... 475/210 |
| 5,080,639 A | * 1/1992 | Sakakibara et al. ......... 475/211 |
| 5,378,198 A | * 1/1995 | Moroto et al. ................. 474/8 |
| 5,976,044 A | 11/1999 | Kuyama |

FOREIGN PATENT DOCUMENTS

| JP | 62-13853 | 1/1987 | | |
| JP | 62-209260 A | * 9/1987 | ................. | 474/12 |
| JP | 03-4064 A | * 1/1991 | ................. | 74/745 |
| JP | 5-106700 | 4/1993 | | |
| JP | 6-62255 | 9/1994 | | |
| JP | 06-249309 A | * 9/1994 | ................. | 474/18 |
| JP | 10-110813 | 4/1998 | | |
| JP | 2000-283253 | 10/2000 | | |
| JP | 2001-330096 A | * 11/2001 | ............. | F16H/9/18 |
| JP | 2002-130409 | 5/2002 | | |

OTHER PUBLICATIONS

U.S. Appl. No. 10/148,203, filed Jun. 7, 2002, Temma.

* cited by examiner

Primary Examiner—Marcus Charles
(74) Attorney, Agent, or Firm—Armstrong, Kratz, Quintos, Hanson & Brooks, LLP

(57) ABSTRACT

A continuously variable transmission including a driving pulley, a driven pulley, an endless dry-type belt wound around both pulleys, a tension-adjusting device for pressing the slack side of the belt to generate belt tension, stroke mechanisms provided on both pulleys for axially shifting the movable sheaves, a ratio-changing motor, and a gear mechanism for transmitting the rotational force generated by the motor to both stroke mechanisms in such a way that the movable sheaves of both pulleys can be shifted synchronously and axially oppositely in relation to the fixed sheaves. With this arrangement, the belt is prevented from slipping, the transmission ratio can be controlled precisely and stably, and the shift-response of this transmission can be improved. The motor can be reduced both in its size and its consumption of electric power.

13 Claims, 13 Drawing Sheets

CONTINUOUSLY VARIABLE TRANSMISSION

BACKGROUND OF THE INVENTION

1. Field of the Invention

The present invention relates to a continuously variable transmission, and more particularly, it relates to a V belt continuously variable transmission for an automobile.

2. Description of the Related Art

Generally, a continuously variable transmission has been proposed, as described in Japanese Laid Open Patent No. 64-58848 (1989) for example, which includes a driving pulley, a driven pulley, a metallic belt placed around the driving and driven pulleys, a pressure regulating mechanism attached to at least one of those pulleys for exerting an axial force corresponding to the applied torque, and stroke mechanisms (actuator mechanisms) attached to the driving and driven pulleys respectively for moving the movable sheaves in the axial direction, and a shifting device for operating the stroke mechanisms at the time of changing the transmission ratio.

This shifting device includes a motor, an operating shaft having a pair of gears connected to the stroke mechanisms of the driving and driven pulleys respectively, a reduction mechanism consisting of reversible gear train which connects the motor to the operating shaft, and an electromagnetic brake which keeps an output shaft of the motor suspended when the motor is not in operation.

However, because the metallic belt used in this transmission has considerably small coefficient of friction $\mu$ against the pulleys, the pressure regulating mechanism, such as a pressure regulating cam mechanism, should necessarily be attached to at least one of the pulleys for transmitting the torque. The pressure regulating mechanism presses the fixed sheave from behind so that the belt comes into pressure contact with the pulley. Nevertheless, this pressing force, being transmitted to the stroke mechanism via the belt and the movable sheave, exerts heavy loads on the stroke mechanism. Screw means such as a ball screw mechanism is used as the stroke mechanism. However, when such screw means is operated under a large axial force, the screw means is worn away fast, resulting in reduced durability. Further, when such a large axial force is exerted on the stroke mechanism, a larger rotational force is required for operating the stroke mechanism. Consequently, the motor should be larger in its size and in its consumption of electric power. Even when the transmission efficiency of the reduction mechanism is improved, it does not always lead to miniaturization or power saving of the motor.

Besides the above-described metallic belt (wet-type belt), a dry-type belt, which has the friction surface consisting of resin or rubber, etc., for touching with the pulleys, can also be employed. Because the metallic belt is lubricated with oil, the coefficient of friction $\mu$ between the belt and the pulleys is small, whereby strong clamping forces generated by the pressure regulating mechanism should be exerted on the metallic belt in order to achieve the prescribed transmission efficiency. On the contrary, the dry-type belt which is not lubricated with oil has a large coefficient of friction $\mu$ against the pulleys, whereby a high level of transmission efficiency can be achieved without the strong clamping forces on the belt by the pulleys.

Accordingly, an object of the present invention is to provide a continuously variable transmission using a dry-type belt that is capable of solving or preventing the aforementioned problems.

SUMMARY OF THE INVENTION

The transmission of the present invention includes a driving pulley having a fixed sheave fixed onto a driving shaft and a movable sheave supported by the driving shaft movably in the axial direction, a driven pulley having a fixed sheave fixed onto a driven shaft and a movable sheave supported by the driven shaft movably in the axial direction, and an endless dry-type belt wound around the driving and driven pulleys. The belt tension is generated by a tension-adjusting device, which presses a slack side of the belt. In order to change the transmission ratio, the transmission of the present invention further comprises a ratio-changing motor, a stroke mechanism provided on the driving and the driven pulley respectively for axially shifting the movable sheave depending on the inputted rotational force generated by the motor, and a gear mechanism for transmitting the rotational force of the motor to the stroke mechanism on each of the pulleys as well as for mechanically connecting both stroke mechanisms in such a way that the movable sheaves of both pulleys can be shifted synchronously and axially in opposite directions to each other in relation to the fixed sheaves.

In the present invention, the rotational force of the motor is transmitted to the stroke mechanisms of both pulleys via the gear mechanism so as to shift the movable sheaves of both pulleys synchronously and axially in opposite directions to each other in relation to the fixed sheaves. Namely, the widths of the grooves of both pulleys alter oppositely to each other. The rotation angle of the motor is converted into the traveling distance of the movable sheaves in the axial direction by the stroke mechanism, such that the transmission ratio can be controlled to a proper ratio accurately.

The axial reactive force of the belt acting on the movable sheaves is also converted into rotational force by the stroke mechanism. This converted rotational force generated at one pulley is transmitted to the other pulley as a reverse rotational force via the gear mechanism. Accordingly, it is enough for the motor to drive the gear mechanism by a force depending on the difference between the converted rotational forces on both pulleys, so that the motor with a smaller rotational force can change the transmission ratio.

In the present invention, the belt tension is generated not by exerting axial pressing force on the pulley, but by pressing the slack side of the belt by means of the tension-adjusting device. In case of a dry-type belt, the coefficient of friction between the pulleys and the belt is so large that a belt tension required for transmitting the driving torque can be generated sufficiently by this tension-adjusting device, which presses the slack side of the belt. Accordingly, the stroke mechanism of the present invention can operate smoothly because excessive axial force is not exerted on the stroke mechanism. The rotational force of the motor is converted into the axial force to shift the movable sheaves via the gear mechanism and the stroke mechanism without loss. As a result, the shift-response of this transmission can be improved, which leads to a high performance of returning to the Low range of the transmission ratio at a hard breaking operation. Further, for the same reason, the motor can be reduced both in its size and its consumption of electric power.

The stroke mechanism, which converts inputted rotational motion into axial movement of the movable sheave, may include a screw mechanism such as a ball screw mechanism.

Among various types of ball screw mechanism, it may consist of, for example, a first screw member which is coupled with the movable sheave rotatably via a bearing but not movably in the axial direction, a second screw member fixed to a fixed member such as a housing, and balls arranged between both screw members. In this case, when a rotational force is inputted to the first screw member, the first screw member is axially moved to the second screw member with its rotating motion, such that only this axial movement is transmitted to the movable sheave. Therefore, the movable sheave can move only in the axial direction without being twisted in relation to the fixed sheave.

The gear mechanism may include a shift input gear attached coaxially to the driving pulley, a gear train for transmitting the rotational force of the motor to the shift input gear on the driving pulley, another shift input gear attached coaxially to the driven pulley, and a shift-operating shaft which has a first and a second shift-operating gears engaging with the respective shift input gears on the driving and driven pulleys. The shift-operating shaft may transmit rotational force from the shift input gear on the driving pulley to the shift input gear on the driven pulley.

In a preferred embodiment, the rotational force of the motor is transmitted to the shift input gear on the driving pulley, and further to the shift input gear on the driven pulley via the shift-operating gears fixed to the shift-operating shaft. Therefore, the driven pulley operates slightly later than the driving pulley due to backlash or flexure of the gear mechanism. At a hard breaking operation, the transmission ratio should return to the Low range before the vehicle stops. For this returning operation to the Low range, the groove of the driving pulley should be widened, whereas the groove of the driven pulley should be narrowed. As described above, since the widening motion of the driving pulley starts slightly earlier, it becomes easier for the driven pulley to narrow its groove. Owing to this arrangement, the preferred embodiment can achieve quicker return to the Low range compared with a case in which the rotational force of the motor is transmitted to the shift input gear on the driven pulley, further to shift-operating gears, and further to the shift input gear on the driving pulley, or with a case in which the rotational force of the motor is divided to be transmitted to the shift input gears on the driving and driven pulleys respectively.

In the above-described gear mechanism, which includes the shift-operating shaft having the first and second shift-operating gears engaging with the shift input gears on the driving and driven pulleys respectively, the axial lengths of the first and second shift-operating gears may correspond to stroke distances of the stroke mechanisms of the driving and driven pulleys respectively. Also, the shift input gears of the driving and driven pulleys may be made of resin, whereas the first and the second shift-operating gears may be made of metal.

In the present invention, a dry-type belt that should not be lubricated with oil is used. Because a chamber for enclosing the pulleys should not be lubricated with oil, the gear mechanism arranged in this chamber should not be lubricated, either. Therefore, by using resin gears as the shift input gears of the driving and driven pulleys, it becomes possible to drive in non-lubricant condition. In this case, the first and second shift-operating gears could also be formed of resin gears. However, since the engaging positions of those shift-operating gears vary depending on the transmission ratio, the shift-operating gears tend to get deflected abrasion. Therefore, the first and second shift-operating gears should preferably be formed by metallic gears, which have higher rigidity than resin gears. When resin gears are employed in the gear mechanism, the time lag between the motions of the driven pulley and the driving pulley becomes longer due to elasticity of those resin gears. Thus, a higher performance of returning to the Low range of the transmission ratio at a hard breaking operation can be achieved.

The above-described gear mechanism may preferably be a gear train consisting of circular and reversible gears, such as spur gears or helical gears. When reversible gears are used in the gear mechanism, the rotational force is transmitted at high transmittal efficiency such that a high level response of the ratio-changing operation can be attained even by using a small sized motor. However, in case of the reversible gears, axial force exerted on the movable sheave may act to rotate the stroke mechanism reversibly, and may further act to rotate the motor shaft reversibly via the gear mechanism. Therefore, the transmission ratio may possibly change when an electric current is not applied to the motor. When a continuously variable transmission comprises a dry-type belt having a high coefficient of friction $\mu$, the axial force exerted on the movable sheave can be so small that the transmission ratio can be kept unchanged by only the starting resistance generated by a magnet in the motor (generated only when an electric current is not applied), without an exclusive brake means. Incidentally, a brake means for preventing reverse rotation of the motor shaft may be added for safety's sake.

In the above-described gear mechanism, which includes the shift-operating shaft having the first and second shift-operating gears engaging with the shift input gears on the driving and driven pulleys respectively, the shift-operating shaft may preferably be arranged at a position inside of a running loop of the above described belt and closer to the tense side of the belt than a straight line S connecting the centers of the axes of the both pulleys. If this shift-operating shaft for transmitting the rotational force of the motor to the stroke mechanisms of both pulleys was arranged outside of the running loop of the belt, the distance between the axes of the driving and driven pulleys could be shortened. However, in this case, the gears fixed to this shaft would protrude outside of the pulleys largely, resulting that the size of the transmission would be larger. On the contrary, if the shift-operating shaft is arranged inside of the running loop of the belt, the pulleys and the gears can be arranged compactly. However, since the distance between the axes of the both pulleys may become longer to some degree, the size of the transmission may also become somewhat larger. Especially, when the tension-adjusting device is used for pressing the belt, the interference between the belt and the shift-operating shaft or that between the tension-adjusting device and the shift-operating shaft may disadvantageously occur. In view of the above, by arranging the shift-operating shaft at a position inside of the running loop of the belt and closer to the tense side of the belt than the straight line S connecting the centers of the axes of the both pulleys, it becomes possible to shorten the distance between the axes of the driving and driven pulleys while preventing the interferences between the shift-operating shaft and the belt or the tension-adjusting device.

The above-described stroke mechanism may include a first screw member and a second screw member engaging with each other. The second screw member may be whirl-stopped by a housing, whereas the first screw member may be associated with the movable sheave rotatably via a first bearing but not slidably in the axial direction. The shift input gear may be fixed to the first screw member. The stroke mechanism may further comprise a second bearing, which rotatably supports the driving shaft or the driven shaft onto the housing. The first and the second bearings may preferably be placed so close to each other in the axial direction that the first and second screw members partially overlap with the first and second bearings at the outside of the bearings in radial direction when the width of the pulley's groove is at its maximum. In this case, as those two bearings and both screw members partially overlap with each other in radial direction, the axial length of the stroke mechanism can be shortened according to the overlapped areas. Since the diameters of the first and second screw members are larger than those of the two bearings, the distances of thread engagement of those screw members can be long enough to realize stable stroke actuation even when the axial lengths thereof are short.

The above described tension-adjusting device may preferably comprise a tension roller coming into pressure contact with the slack side of the belt from outside, a tensioner arm whose one end is swingably supported on the housing at a position outside of either of the pulleys in radial direction and whose other end has the tension roller attached thereto, and an urging means for swingingly urging the tensioner arm in such direction that the tension roller presses the belt. The tensioner arm may preferably be longer than the diameter of the pulley and curved along the outer periphery of this pulley. Further, the tensioner arm may preferably be arranged in such a way that the traveling locus of the axis for supporting the tension roller passes between the driving and driven pulleys. Since the tension roller presses the slack side of the belt from outside to generate proper tension, the contact areas of the belt wound around the pulleys are increased as compared with a case in which the belt is pressed from inside, thereby the transmission efficiency can be improved. By arranging the rotation fulcrum of the tensioner arm on the housing at a position outside of a pulley in radial direction, and by making the center in width of the tensioner arm substantially correspond to the center of the pulley in the axial direction, it becomes possible to support a central shaft of the tension roller at both ends thereof with the tensioner arm without inclination. As a result, the tension roller can contact with the belt in well-balanced condition.

Other features of the present invention will be explained in detail in the following description of the embodiments.

DETAILED DESCRIPTION OF THE PREFERRED EMBODIMENT

Figure 7:
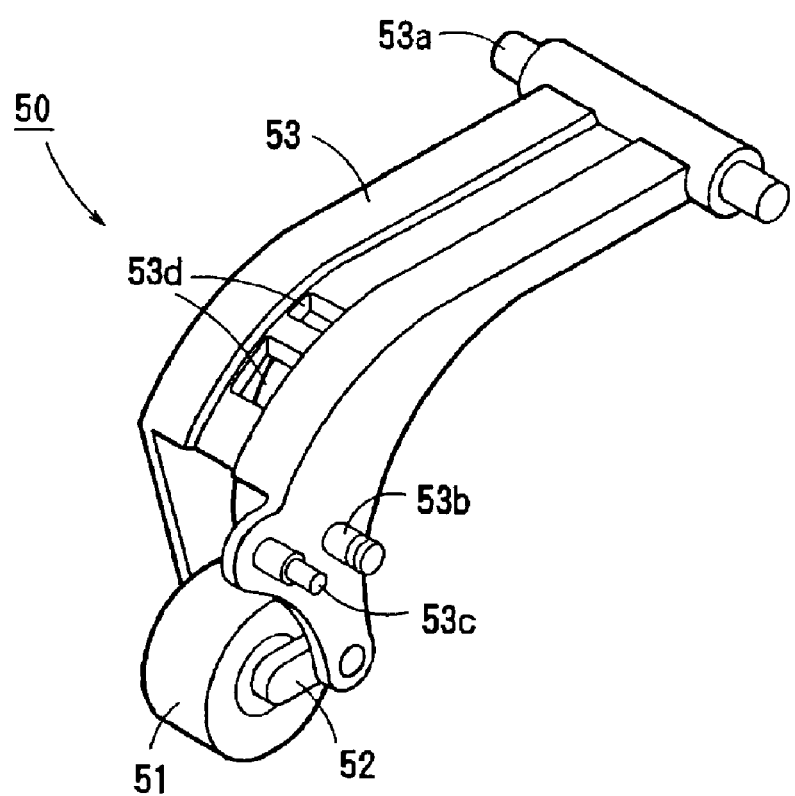
FIG. 7 is a perspective view of a tensioner arm.
Figure 8:
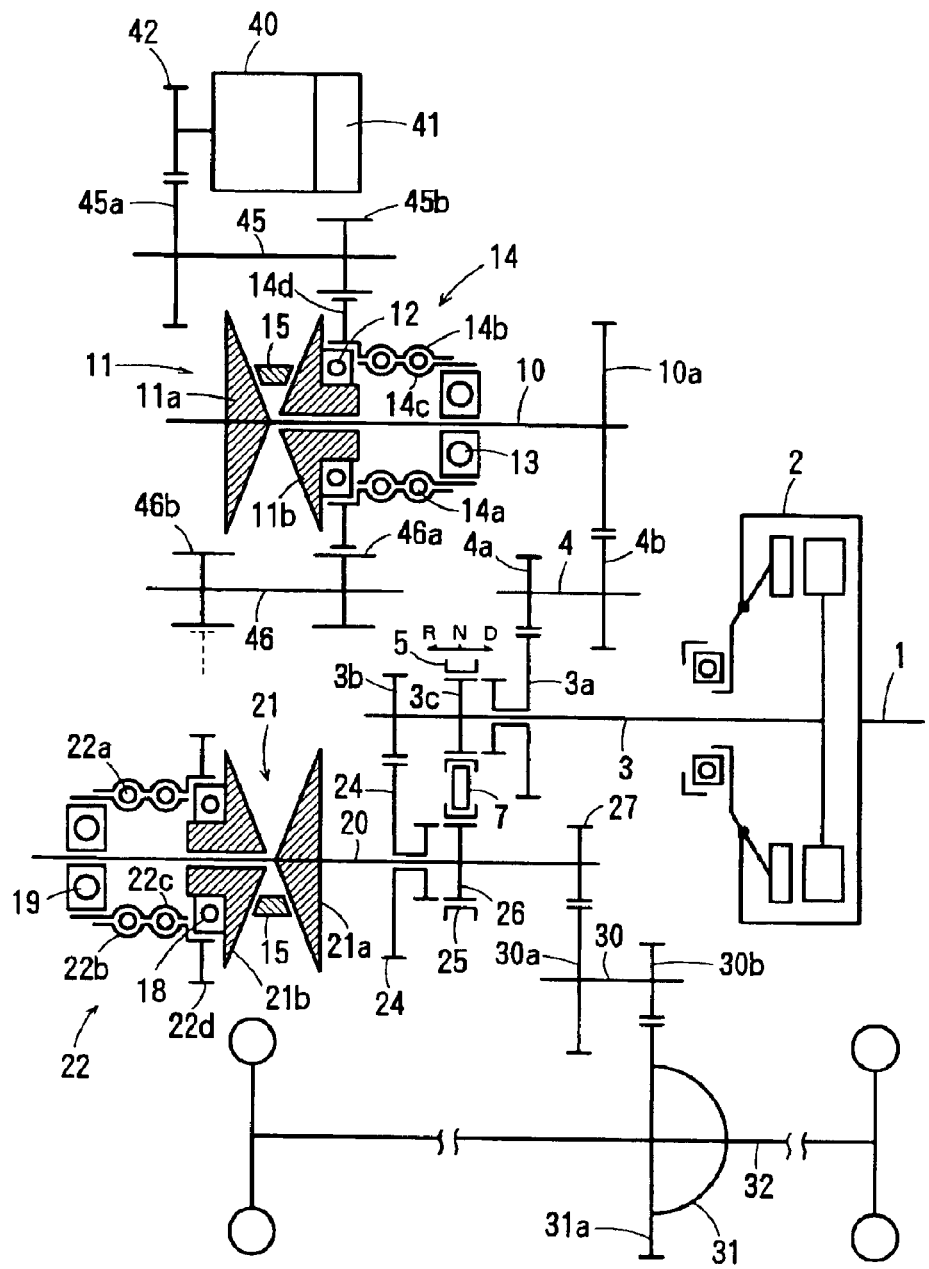
FIG. 8 is a skeleton diagram of the continuously variable transmission shown in FIG. 1.

FIGS. 1 to 7 show a specific structure of a continuously variable transmission according to a first embodiment of the present invention, and FIG. 8 shows the skeleton structure thereof.

This continuously variable transmission, which is employed in a vehicle having a transversely mounted FF (front engine-front drive) system, generally comprises an input shaft 3 driven by an engine output shaft 1 via a starting clutch 2, a countershaft 4, a driving shaft 10 supporting a driving pulley 11, a driven shaft 20 supporting a driven pulley 21, a dry-type endless V belt 15 running around the driving pulley 11 and the driven pulley 21, a reduction shaft 30, output shafts 32 coupled with wheels, a ratio-changing motor 40, a tension-adjusting device (tensioner) 50 and the like. The input shaft 3, the countershaft 4, the driving shaft 10, the driven shaft 20, the reduction shaft 30 and the output shafts 32 are arranged non-coaxially and in parallel with each other.

Though the starting clutch 2 is formed by a dry-type clutch in this embodiment, a wet-type clutch or a fluid coupling such as a torque converter can also be used. The input shaft 3 is rotatably supported by a transmission case (a housing) 60 via a bearing. The input shaft 3 has a forward movement gear 3a which is rotationally supported on the shaft 3, and a reverse movement gear 3b which is fixed to shaft 3. A synchronous-type forward switching device 5 selectively couples the forward gear 3a to a clutch hub 3c, which is fixed to the input shaft 3. This forward switching device 5 can be shifted to three positions, i.e. to a forward-drive position D, a neutral position N or a reverse-drive position R by means of a fork 7.

A gear 4a, which meshes with the forward gear 3a, and a gear 4b, which meshes with a gear 10a fixed to an end of the driving shaft 10 at the side close to the engine, are fixed to the countershaft 4. By properly selecting the reduction ratio of the gears 4a and 4b of the countershaft 4, the driving torque is transmitted from the input shaft 3 to the driving shaft 10 at a reduction ratio which is suitable for driving the belt.

The driving pulley 11 includes a fixed sheave 11a fixed onto the driving shaft 10, a movable sheave 11b supported by the driving shaft 10 movably in the axial direction and a stroke mechanism 14 provided at the back side of the movable sheave 11b. The stroke mechanism 14 is arranged to be closer to the engine than the V belt 15. According to this embodiment, the stroke mechanism 14 is a ball screw mechanism that shifts the movable sheave 11b in the axial direction depending on the rotational force inputted from the ratio-changing motor 40. The stroke mechanism 14 includes a female screw member 14b which is rotatably supported on the movable sheave 11b via a bearing 12, a male screw member 14c which is fixedly associated with the transmission case 60, and balls 14a arranged between those female and male screw members 14b and 14c. A shift input gear 14d is fixed to the outer periphery of the female screw member 14b. The shift input gear 14d is a thin resin gear, which is larger in diameter than the movable sheave 11b of the driving pulley 11. The driving shaft 10 is rotatably supported on the transmission case 60 via a bearing 13. The outer race of the bearing 13 is fixedly associated with the transmission case 60 and the male screw member 14c.

The driven pulley 21 includes a fixed sheave 21a fixed onto the driven shaft 20, a movable sheave 21b supported by the driven shaft 20 movably in the axial direction, and an stroke mechanism 22 provided at the back side of the movable sheave 21b. The stroke mechanism 22 is arranged on a side opposite to the engine beyond the V belt 15. The stroke mechanism 22, which is also a ball screw mechanism similar to the stroke mechanism 14 of the driving pulley 11, includes a female screw member 22b which is rotatably supported on the movable sheave 21b via a bearing 22a, a male screw member 22c which is fixedly associated with the transmission case 60, and balls arranged between those screw members. A shift input gear 22d is fixed to the outer periphery of the female screw member 22b. The shift input gear 22d is also a thin resin gear, which is larger in diameter than the movable sheave 21b of the driven pulley 21.

Figure 15:
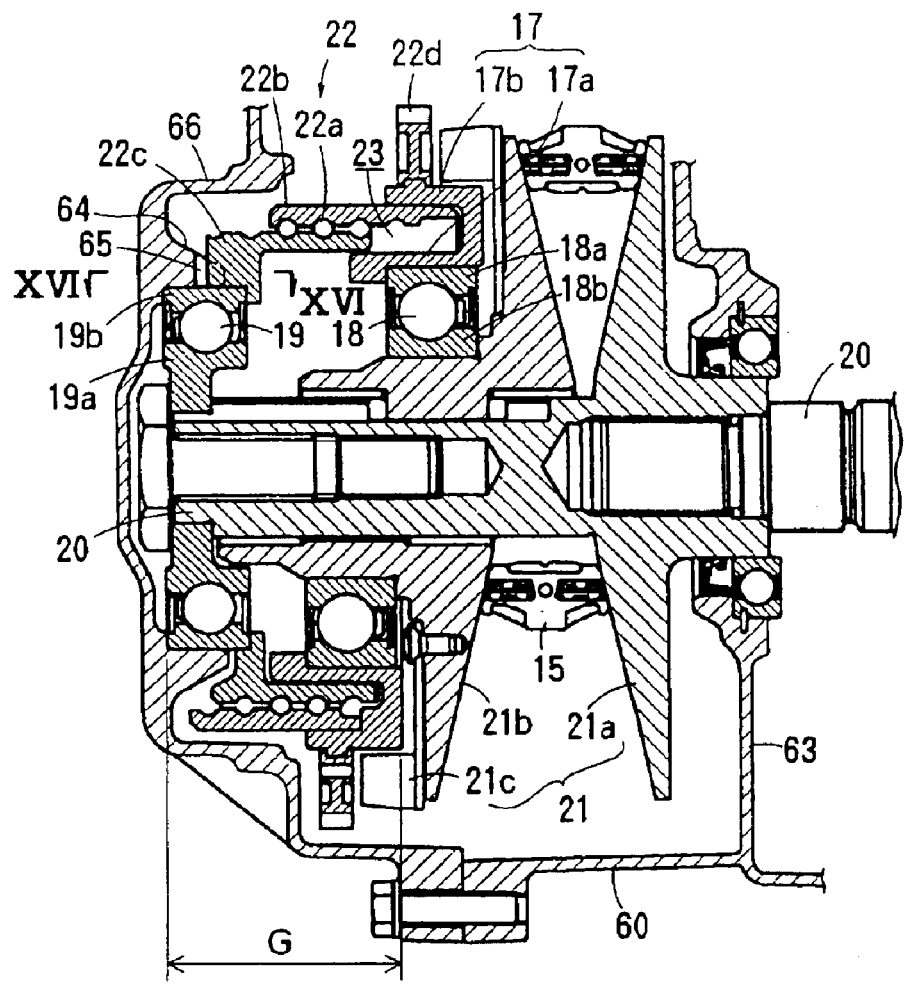
FIG. 15 is an enlarged sectional view of the stroke mechanism of the driven pulley.
Figure 16:
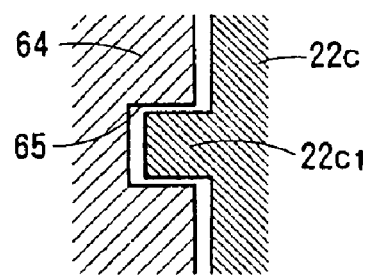
FIG. 16 is a sectional view taken along the line XVI—XVI in FIG. 15.

A specific structure of the stroke mechanism 22 will now be described with reference to FIGS. 15 and 16. Because the structure of the stroke mechanism 14 is symmetrical to that of the actuator 22, redundant explanation will be omitted.

As described above, the actuator 22 includes a first bearing 18, the female screw member 22b, the male screw member 22c, the shift gear (input gear) 22d, and a plurality of balls 22a arranged between the female and the male screw members 22b and 22c. An inner race 18b of the bearing 18 is fixedly set on the movable sheave 21b, and the female screw member 22b and the shift input gear 22d are fixed to an outer race 18a via a bracket 17 having channel-shaped cross section. Specifically, the outer race 18a is fixed to an inner surface of an inner ring 17a of the bracket 17, the shift input gear 22d is fixed to an outer surface of an outer ring 17b of the bracket 17, and the female screw member 22d is fixed to an inner surface of the outer ring 17b of the bracket 17. An end of the male screw member 22c in the axial direction is to be inserted into a circular space 23 surrounded by the female screw member 22b and an outer surface of the inner ring 17a of the bracket 17.

Figure 9:
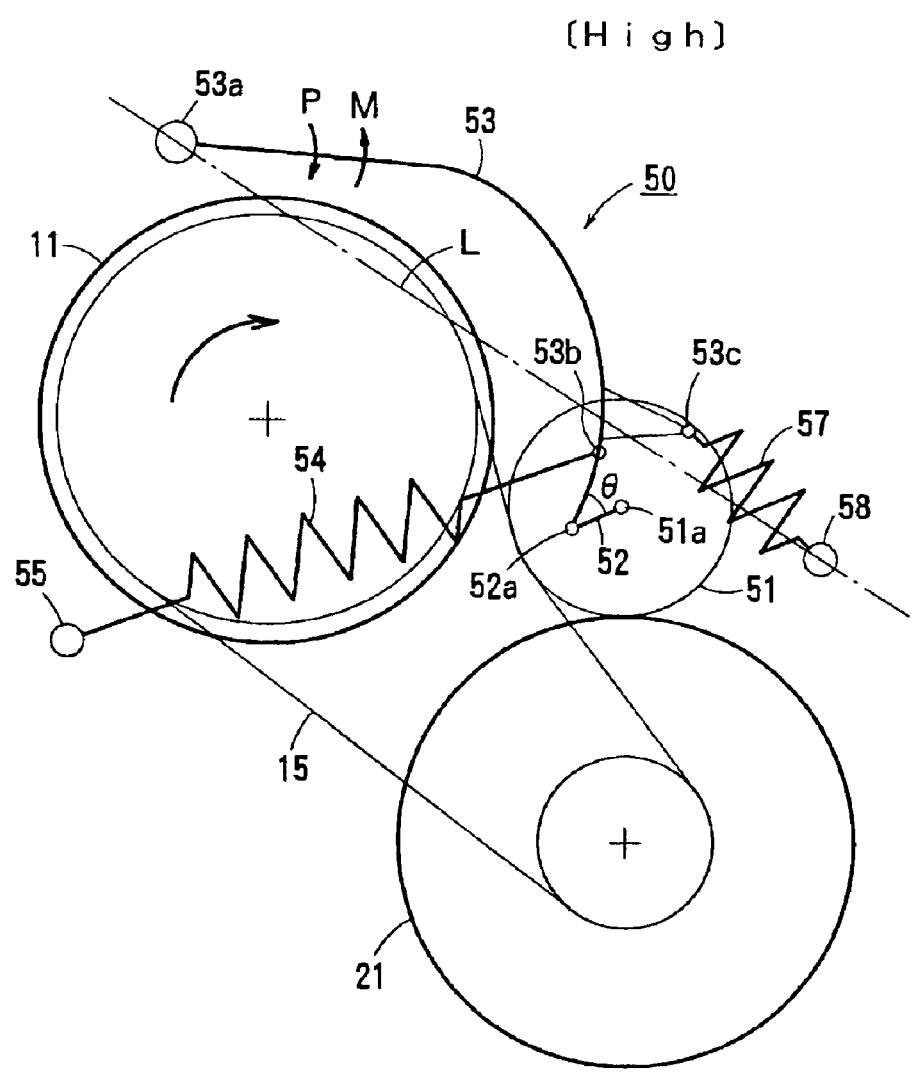
FIG. 9 illustrates a contact position of a tension roller to a belt at a highest transmission ratio (at a highest vehicle-speed ratio or high gear)

Further, a second bearing 19 for rotatably supporting the driven shaft 20 is arranged between the transmission case 60 and the driven shaft (pulley shaft) 20. An inner race 19a of the bearing 19 is fixed to the driven shaft 20, and an outer race 19b, to which the other end of the male screw member 22c is fitted, is fixedly inserted in a bearing-holding portion 64 of the transmission case 60. Especially, this other end of the male screw member 22c has a plurality of projecting stoppers (three stoppers, for example) 22ci in a concyclic manner as shown in FIG. 9, and the bearing-holding portion 64 has concave portions 65 to be associated with those stoppers 22ci. As a result, the driven shaft 20, being the pulley shaft as well, is stably supported by the transmission case 60 via the bearing 19, and the male screw member 22c is securely whirl-stopped by the transmission case 60.

As described above, the female screw member 22b and the male screw member 22c in the stroke mechanism 22 are arranged at the outer peripheral of the bearings 18 and 19 in such a way that the screw members 22b and 22c partially overlap with the bearings 18 and 19 in the axial direction at the outside of the bearings in radial direction when those screw members 22b and 22c are meshed to the deepest position (when the width of the pulley's groove is at its maximum). Accordingly, the minimum length G of the stroke mechanism 22 in the axial direction can be shortened corresponding to the length of the area, in which the bearing 18 and 19 partially overlap with the screw members 22b and 22c in the axial direction.

Further, because the channel-shaped bracket 17 is used, the shift input gear 22d can be fixed to the bracket 17 which is fixed to the outer race of the bearing 18, so that the shift input gear 22d can be securely supported and its abrasion can be reduced. Also, since the female screw member 22b is fixed to the inner surface of the outer ring of the bracket 17, the female screw member 22d can be prevented from being inclined, resulting that the stroke mechanism can actuate more stably.

A surrounding wall 66, which is integrally formed in the circumference of the bearing-holding portion 64 of the transmission case 60, always overlaps with an outer surface of the female screw member 22d. As a result, the thread grooves of the male screw member 22c are always covered with the surrounding wall 66 so as to be kept clean of dust. The female screw member 22b is fixed to the outer race 18a via the channel-shaped bracket 17 such that the end of the circular space 23 at the side of the movable sheave is closed, whereby the thread grooves can be kept clean of dust.

A reverse gear 24, which is rotatably supported onto the driven shaft 20 at a side closer to the engine than the driven pulley 21, meshes with the reverse movement gear 3b fixed to the input shaft 3. A reverse switching device 25 selectively couples the gear 24 to a clutch hub 26 fixed to the driven shaft 20. The folk 7 for shifting the above-mentioned forward switching device 5 is also associated with the reverse switching device 25. Thus, by manipulating the fork 7, both switching devices 5 and 25 can be shifted simultaneously. To be more specific, when the folk 7 is shifted to the right side position in FIG. 8, the forward switching device 5 connects the clutch hub 3c with the forward gear 3a, whereas the reverse switching device 25 is separated from the reverse gear 24, so that the shift position of the transmission takes D range. When the folk 7 is shifted to the middle position, both of the switching devices 5 and 25 are separated from the forward gear 3a and the reverse gear 24 respectively, so that the shift position of the transmission takes N range. When the folk 7 is shifted to the left side position in FIG. 8, the reverse switching device 25 connects the clutch hub 26 with the reverse gear 3b, whereas the forward switching device 5 is separated from the forward gear 3a, so that the shift position of the transmission takes R range. In this way, since the only one fork 7 can operate both of the switching devices 5 and 25, such a trouble will never occur that the reverse switching device 25 takes the position R at the time when the forward switching device 5 takes the position D.

A reduction gear 27, which is integrally formed on an end of the driven shaft 20 closer to the engine, meshes with a gear 30a fixed to the reduction shaft 30. Further, a gear 30b which is integrally formed on the reduction shaft 30 meshes with a ring gear 31a of a differential gear unit 31. Thus, the wheels of the automobile, which are connected to the output shafts 32 provided on the differential gear unit 31, are driven.

The above described forward gear 3a and the reverse gear 3b on the input shaft 3, the forward switching device 5, the gears 4a and 4b on the countershaft 4, the gear 10a on the driving shaft 10, the reverse gear 24 on the driven shaft 20, the reverse switching device 25, the reduction gear 27, the gears 30a and 30b on the reduction gear 30 and the differential gear unit 31 are all arranged in a gear chamber 61, which is formed in the transmission case 60 at side close to the engine. This chamber 61 is lubricated with oil. On the contrary, the driving pulley 11 and the driven pulley 21 are arranged in a pulley chamber 62 of the transmission case 60, which is separated from the gear chamber 61 by a partition wall 63. The pulley chamber 62 is a non-lubricated space.

The power flows at the time of forward-drive and reverse-drive of the continuously variable transmission having the aforementioned structure are described as follows.

At the time of forward driving, the folk 7 is manipulated so as to shift the forward switching device 5 to the forward position D. The engine power inputted from the starting clutch 2 to the input shaft 3 is transmitted to the output shaft 32 via the forward gear 3a, the countershaft 4, the driving shaft 10, the driving pulley 11, the V-belt 15, the driven pulley 21, the driven shaft 20, the reduction shaft 30 and the differential gear unit 31. At the time of reverse driving, the folk 7 is manipulated so as to shift the reverse switching device 25 to the reverse position R. The engine power inputted from the starting clutch 2 to the input shaft 3 is transmitted to the output shaft 32 via the reverse gears 3b and 24, the driven shaft 20, the reduction shaft 30 and the differential gear unit 31. Namely, in the reverse driving, the engine power is transmitted bypassing the V-belt 15.

The tensioner 50 for pressing the slack side of the belt 15 is provided so as to generate belt tension as described later. In the reverse driving, since the belt 15 is driven in reverse direction, the slack and the tense sides of the belt may be replaced with each other. Consequently, the tensioner 50 might disadvantageously press the tense side so as to apply excessive load to the belt 15. According to this embodiment, however, since the driving torque is transmitted to the belt 15 only at the time of the forward driving, but not transmitted at the time of the reverse driving, the tensioner 50 always presses the slack side of the V-belt 15. Thus, the burden of the belt 15 can be reduced, resulting in improved belt durability.

A ratio-changing mechanism in the continuously variable transmission of this embodiment will now be described.

The ratio-changing motor 40 is positioned at the outer side of the transmission case 60, particularly on a position obliquely above the driving pulley 11. The motor 40 is a servomotor having a brake 41. The motor 40 has an output gear 42 which meshes with a reduction gear 45a provided at an end of a first shift-operating shaft 45. The first shift-operating shaft 45 is mounted across the inside walls of the transmission case 60, and is arranged in the pulley chamber 62 together with the output gear 42. A gear 45b, provided on the other end of the first shift-operating shaft 45, is a spur gear or a helical gear having an axial length corresponding to the stroke distance of the movable sheave 11b of the driving pulley 11. The gear 45b meshes with the shift input gear 14d provided on the driving pulley 11. The first shift-operating shaft 45 and the gears 45a and 45b are all formed of metallic material. When the gear 45b of the shaft 45 is rotated, the shift input gear 14d is responsively rotated so that the movable sheave 11b can be axially shifted due to the ball screw mechanism (the stroke mechanism) 14. Namely, the width of the groove of the driving pulley 11 (the running diameter of the belt around the driving pulley) can be continuously changed.

Figure 1:
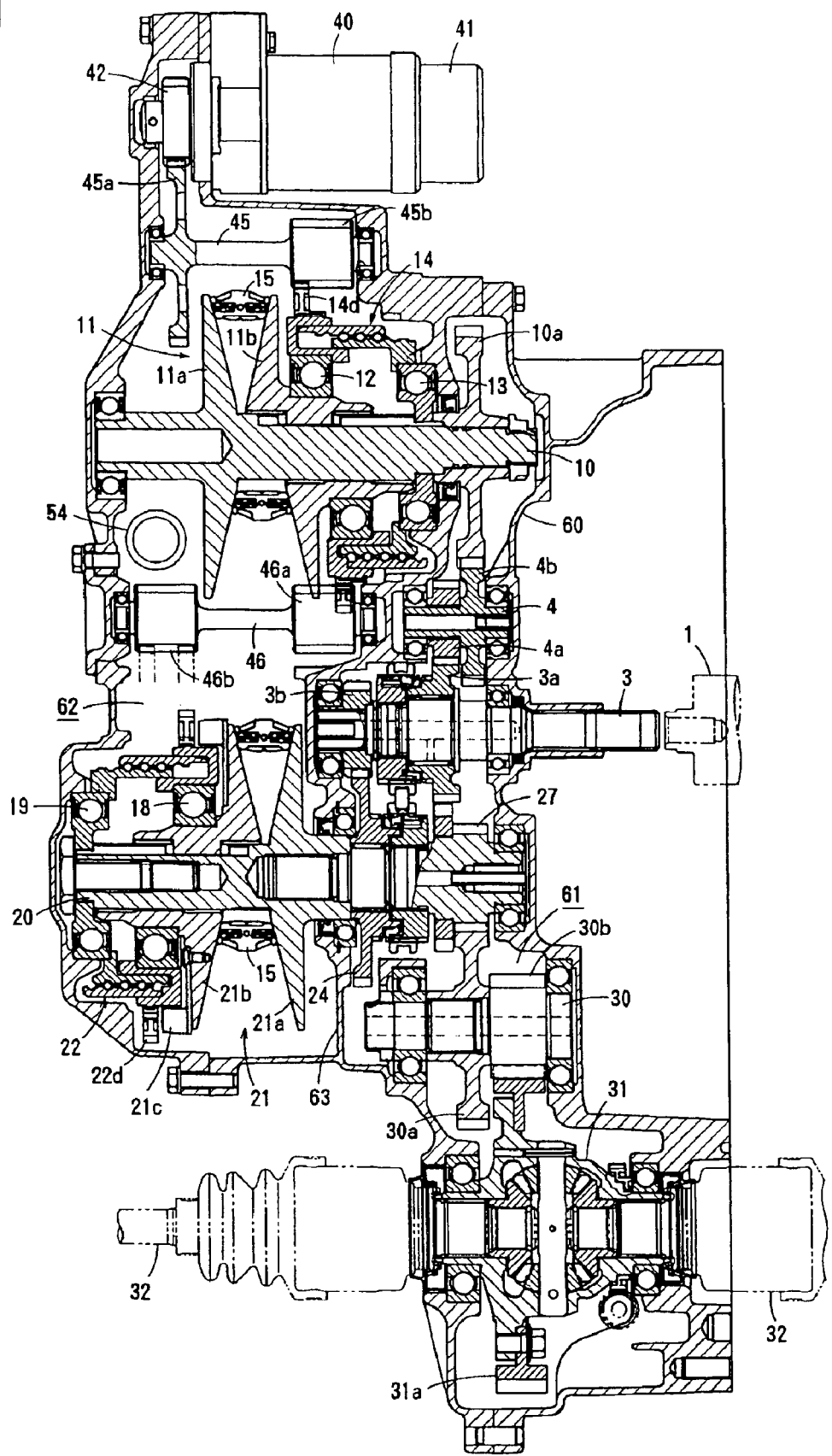
FIG. 1 is an expanded sectional view showing a continuously variable transmission according to a first embodiment of the present invention.
Figure 2:
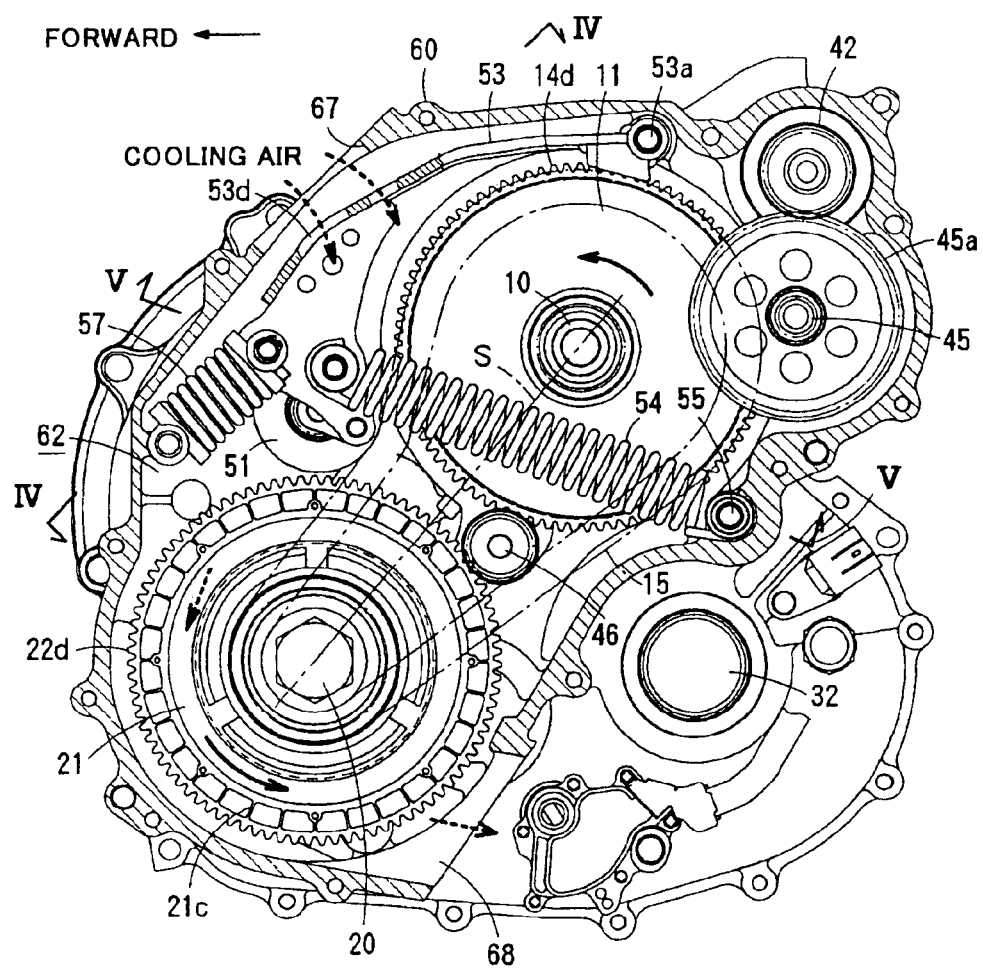
FIG. 2 is a sectional view of a pulley chamber of the continuously variable transmission shown in FIG. 1.
Figure 3:
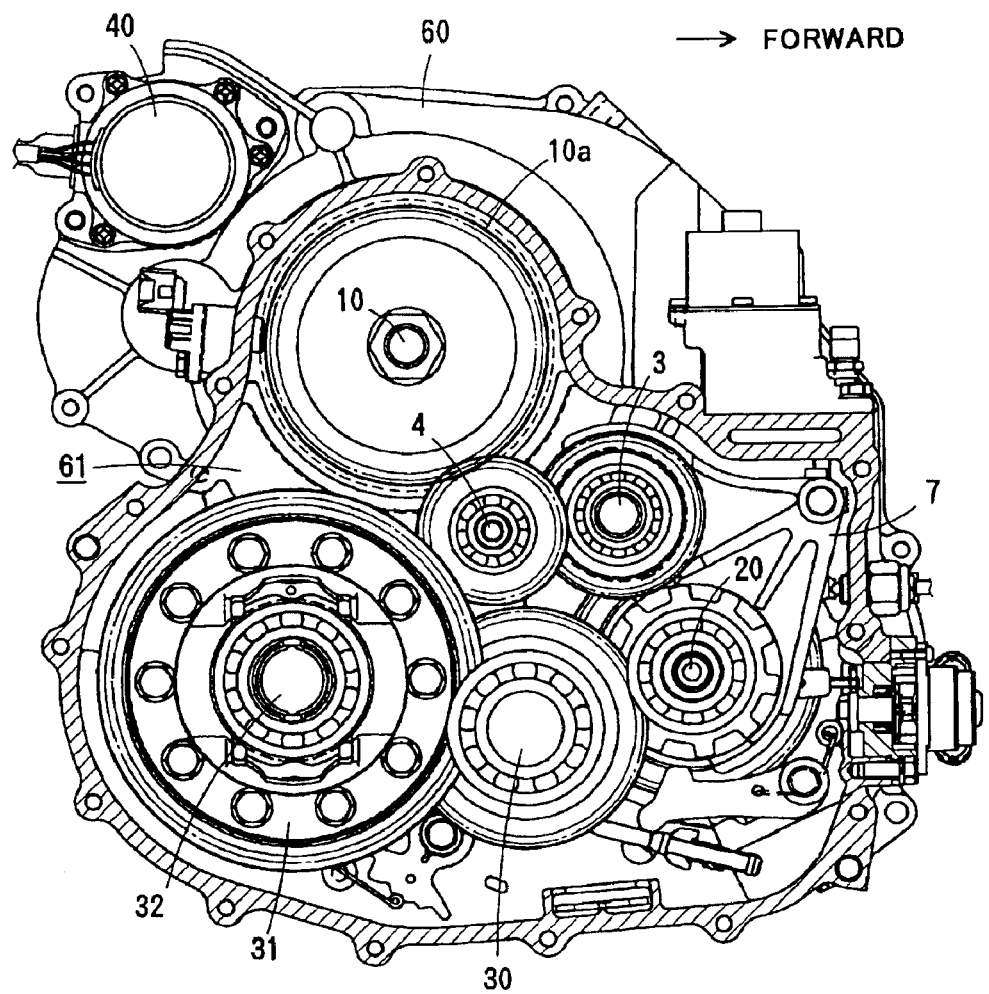
FIG. 3 is a sectional view of a gear chamber of the continuously variable transmission shown in FIG. 1.

The shift input gear 14d of the driving pulley 11 also meshes with a first shift-operating gear (an idler gear) 46a of a second shift-operating shaft (an idler shaft) 46 which is mounted across the inside walls of the transmission case 60. Also, a second shift-operating gear (an idler gear) 46b of the second shift-operating shaft 46 meshes with the shift input gear 22d of the driven pulley 21. These shift-operating gears 46a and 46b are also spur gears or helical gears having axial lengths corresponding to stroke distances of the movable sheaves 11b and 21b. similarly to the gear 45b of the first shift-operating shaft 45. The shaft 46 as well as the gears 46a and 46b are formed of metallic material. As shown in FIG. 2, the second shift-operating shaft 46 is arranged between the driving pulley 11 and the driven pulley 21, and inside of the running loop of the belt 15. Especially, the second shift-operating shaft 46 is arranged at a position closer to the tense side of the belt 15 than to a straight line S connecting the centers of the axes of the driving pulley 11 and the driven pulley 21 (see FIG. 2). By arranging the second shift-operating shaft 46 off the straight line S connecting the centers of the axes of the pulleys 11 and 21, the distance between the axes of those two pulleys can be shortened. Also, since the tension-adjusting device 50 presses the slack side of the belt 15 from outside as described later, the interference between the incurvated section of the belt 15 and the second shift-operating shaft 46 can be prevented. Since the position of the tense side of the belt 15 hardly changes in relation with the transmission ratio, the interference between the tense side of the belt and the shaft 46 can be securely prevented. Further, due to this arrangement, the shift-operating gears 46a and 46b can be miniaturized as compared with those in the case where the second shift-operating shaft 46 is arranged outside of the running loop of the belt 15.

The rotational force outputted from the ratio-changing motor 40 is transmitted to the shift input gear 22d of the driven pulley 21 via the first shift-operating shaft 45, the shift input gear 14d of the driving pulley 11 and the second shift-operating shaft 46. Therefore, the movable sheave 11a of the driving pulley 11 and the movable sheave 21a of the driven pulley 21 can shift synchronously and axially so as to change the widths of the grooves of both pulleys (the running diameters of the belt around both pulleys) oppositely to each other.

As described above, since a gear mechanism (42, 45a, 45b, 14d, 46a, 46b and 22d) for transmitting the rotational force outputted from the ratio-changing motor 40 to the stroke mechanisms 14 and 22, namely, for mechanically connecting both stroke mechanisms 14 and 22 of the driving pulley 11 and the driven pulley 21 is provided, the positions of the movable sheaves, i.e. the transmission ratio, is mechanically determined. Thus, the transmission ratio can be changed precisely by only controlling the ratio-changing motor 40. Moreover, the transmission ratio is not affected by the temperature and the like.

Among the gears included in the above-mentioned gear mechanism, only the shift input gears 14d and 22d are formed of resin. Because those resin gears 14d and 22d can be driven without lubrication, it is possible to arrange the gear mechanism in the pulley chamber 62 which is not lubricated with oil. Also, due to the flexibility of the shift input gears 14d and 22d made of resin, the motion of the driven pulley 21 for narrowing its groove can be delayed compared with the motion of the driving pulley 11 for widening its groove, whereby a high performance of returning to the Low range of the transmission ratio can be achieved at a hard breaking operation. On the contrary, the shift-operating gears 46a and 46b and the gear 45b of the first shift-operating shaft 45, whose engaging positions vary depending on the transmission ratio, are made of metallic material so as to be prevented from getting deflected abrasion.

Because the gear mechanism ( 42, 45a, 45b, 14d, 46a, 46b, 22d) is composed of circular and reversible gears such as spur gears or helical gears, which perform at high transmittal efficiency, the gear mechanism may possibly rotate due to the reactive force from the movable sheave caused by the belt tension, resulting that the transmission ratio undesirably change when an electric current is not applied to the ratio-changing motor 40. However, since a dry-type belt is used for the belt 15, the reactive force from the movable sheave is so small that the starting resistance generated by a magnet in the motor 40 is enough for stopping rotation of the gear train, when an electric current is not applied. In the above-described embodiment, for safety's sake, the brake 41 is provided for stopping the rotation of the output gear 42 when an electric current is not applied to the ratio-changing motor 40. However, this brake 41 could be omitted.

The device for applying tension to the V belt 15, i.e., the tensioner 50 will now be described.

As described above, the widths of the grooves of the pulleys 11 and 21 (the running diameters of the belt around the pulleys) can be changed by the ratio-changing motor 40. However, the belt 15 may slip on the pulleys 11 and 21 due to the transmitted torque. In order to prevent this slippage, the tensioner 50 for applying tension to the belt 15 is provided as shown in FIG. 2 and FIGS. 4 to 7. The tensioner 50 includes a tension roller 51, which is swingably supported by a tensioner arm 53 via a link member 52. Specifically, the link member 52 has pivots 52a, which are formed at an end thereof and are rotatably supported at the forward end of the tensioner arm 52. The other ends 52b of the link member 52 fixedly hold both ends of a central shaft 51a, which rotatably supports the tension roller 51 via bearings 51b.

As shown in FIG. 2, the rotation fulcrum 53a of the tensioner arm 53 is located in the vicinity of the driving pulley 11 at a position outside (especially above) thereof in radial direction. The tensioner arm 53, whose length is longer than the diameter of the driving pulley 11, is curved along the outer periphery of the driving pulley 11. The tensioner arm 53 is located such that the pivots 52a for supporting the tension roller travels along an arched locus, whose center corresponds to the rotation fulcrum 53a and which passes between the driving pulley 11 and the driven pulley 21.

As described above, the rotation fulcrum 53a of the tensioner arm 53 is located at a position outside of the driving pulley 11 in radial direction, and the center in width of the tensioner arm 53 is substantially aligned with the center of the driving pulley 11 in the axial direction. Further, both ends of the central shaft 51a of the tension roller 51 are supported by the tensioner arm 53 via the link members 52. With all these arrangements, it becomes possible to support the central shaft 51a without inclination and to prevent unbalanced contact of the tension roller 51 with the belt 15.

The tensioner arm 53 does not interfere with the driving pulley 11 because it is curved along the outer periphery of the pulley 11. Also, the possibility of interference between the tension roller 51 and either pulley 11 or 21 can be reduced because the tensioner arm 53 is longer than the diameter of the driving pulley 11 and because the locus of the pivots 52a for supporting the tension roller passes between the driving pulley 11 and the driven pulley 21. Specifically, since the V belt 15 becomes elongated or worn away as it is used, the contact position of the tension roller 51 with the belt 15 considerably varies as compared with the initial contact position. However, the tension roller 51 can move to a position where the roller 51 has the least possibility to interfere with the pulley 11 or 21, since the locus of the pivots 52a for supporting the tension roller passes between the driving pulley 11 and the driven pulley 21. Even when the link member 52 is used, the tension roller 51 can be securely supported by the tensioner arm via the link member 52, since the angle between the link 52 and the arm 53 can be reduced and the link 52 can be shortened.

An air intake 67 for taking cooling air into the pulley chamber 62 is provided on the transmission case 60 at a position opposite to the driving pulley 11 beyond the tensioner arm 53. Namely, the air intake 67 is formed at an upper position of the front surface (a position facing the front side of the driving pulley 11) of the transmission case 60. On the other hand, an air outlet 68 is provided at a position outside of the driven pulley 21 in radial direction and oppositely to the intake 67 beyond the driven pulley 21. Namely, the outlet 68 is formed at a lower position of the rear surface of the transmission case 60.

Figure 4:
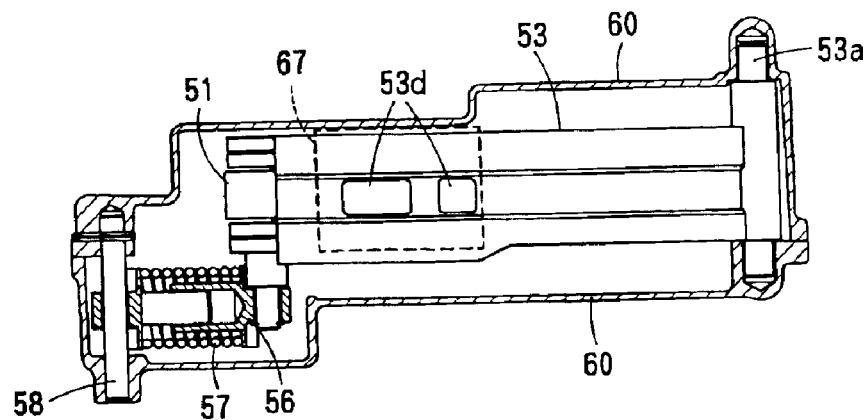
FIG. 4 is a sectional view taken along the line IV—IV in FIG. 2.
Figure 5:
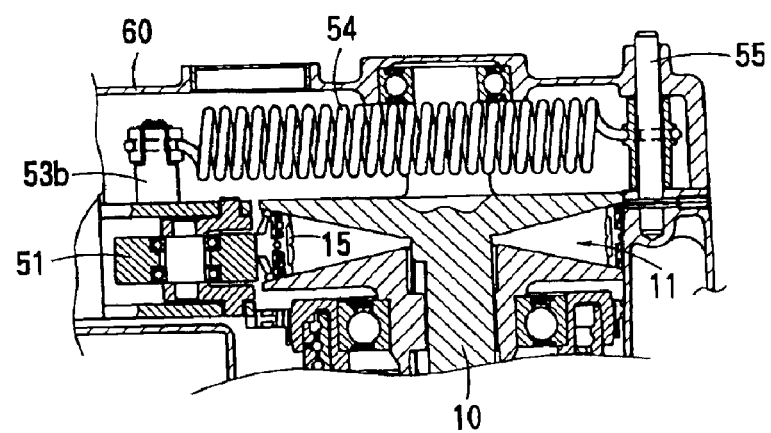
FIG. 5 is a sectional view taken along the line V—V in FIG. 2.
Figure 6:
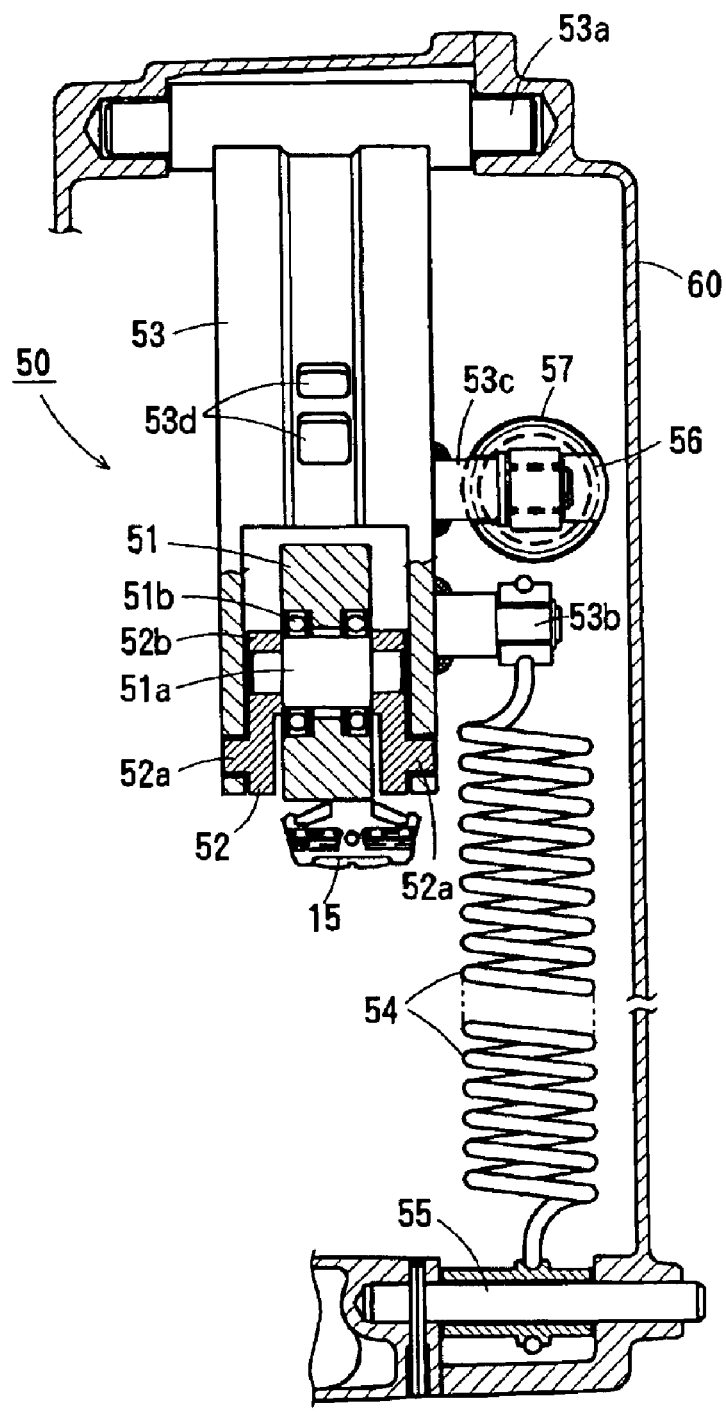
FIG. 6 is a partially fragmented sectional view of a tension-adjusting device of the continuously variable transmission shown in FIG. 1.

As shown in FIG. 4, holes 53d through which the cooling air passes are provided on the tensioner arm 53 at positions facing the air intake 67. A part of the cooling air coming in from the air intake 67 passes through the holes 53d of the arm 53 so as to hit the contact position of the driving pulley 11 with the belt 15, and to directly hit the contact position of the tension roller 51 with the belt 15. Thus, the driving pulley 11 and the belt 15 are cooled down. Also, the tension roller 51, which is difficult to be cooled down because of its location, can be efficiently cooled down. The remaining part of the cooling air, which bypasses the tensioner arm 53, flows through the pulley chamber 62 so as to cool down the belt 15. A fin 21c for generating an air current, which flows from the air intake 67 to the air outlet 68, is provided at the back of the movable sheave 21b of the driven pulley 21. At the high vehicle speed when the belt 15 gets most heated, the driven pulley 21 rotates faster than the driving pulley 11. Therefore, the fin 21c provided at the driven pulley 21 can efficiently generate the air current flowing from the air intake 67 to the air outlet 68. In this way, a large amount of flowing air can pass through the pulley chamber 62 so as to improve the cooling effect.

As shown in FIG. 7, two pins 53b and 53c project from the side surface of the forward end of the tensioner arm 53. One end of a tension spring 54 is hooked on the pin 53b, while one end of an expansion guide 56 for guiding a compression spring 57 is rotatably coupled to the pin 53c. The tension spring 54 extends behind the fixed sheave 11a of the driving pulley 11 through a space between the driving shaft 10 and the driven shaft 20 so that its other end is hooked on a shaft 55, which is fixed to the transmission case 60 at a position opposite to the tensioner arm 53. In this arrangement, the arm 53 is swingably urged by the tensile force of the tension spring 54 in such a way that the tension roller 51 inwardly presses the slack side of the belt 15 from outside. By pressing the V belt 15 inwardly from outside, a proper belt tension can be generated, and the contact areas of the belt 15 around the pulleys 11 and 21 can be increased, resulting that the transmission efficiency is improved.

The other end of the expansion guide 56 for guiding the compression spring 57 is rotatably coupled to a shaft 58 provided on the transmission case 60. The compression spring 57 is assembled with the expansion guide 56 to be guided by the expansion guide 56 only in an expansion direction, so as not to be distorted or bent when the spring 57 and guide 56 swing around the shaft 58.

Operation of the belt pressing force of the tension roller 51 caused by the tension spring 54 and the compression spring 57 depending on the transmission ratio is now described with reference to FIGS. 9 to 14.

Figure 10:
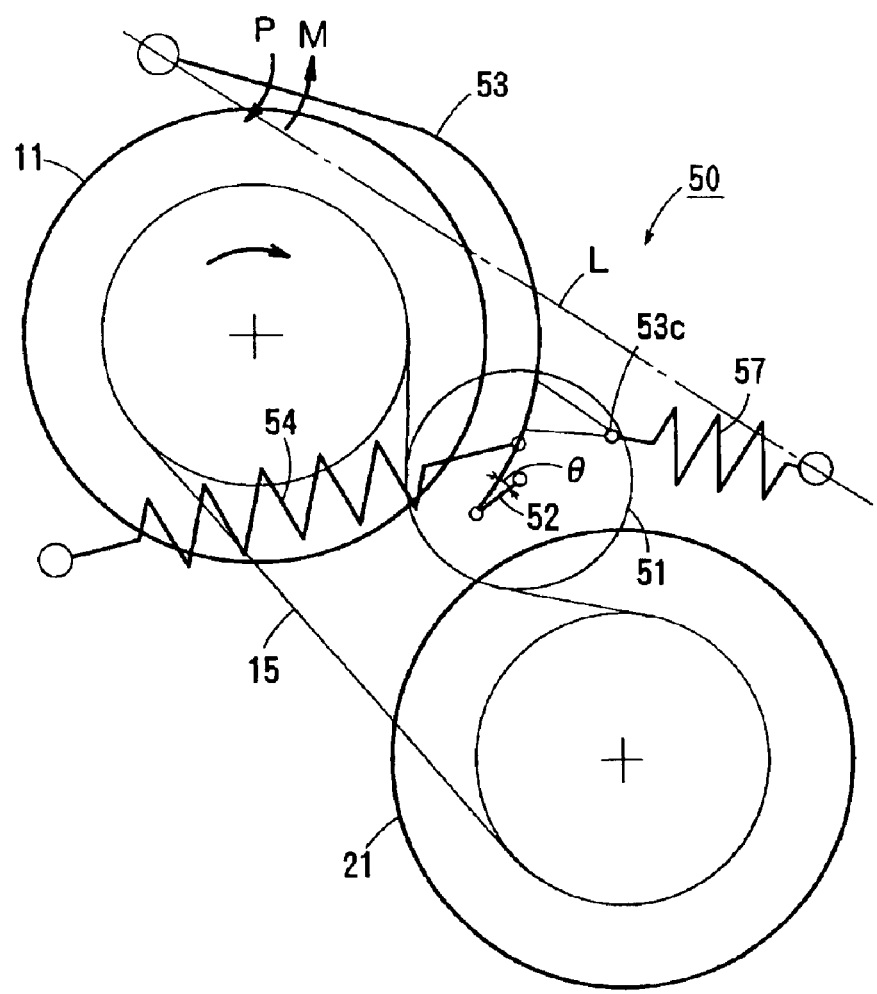
FIG. 10 illustrates a contact position of the tension roller to the belt at a middle transmission ratio.
Figure 11:
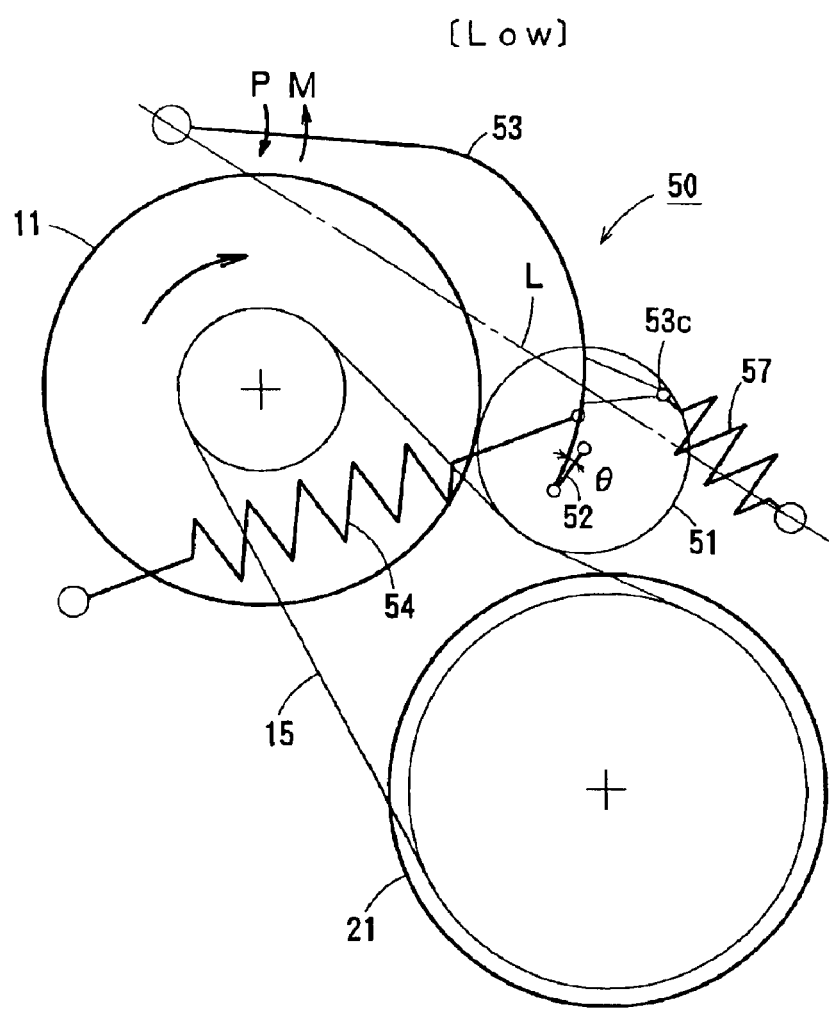
FIG. 11 illustrates a contact position of the tension roller to the belt at a lowest transmission ratio (at a lowest vehicle-speed ratio or low gear)
Figure 12:
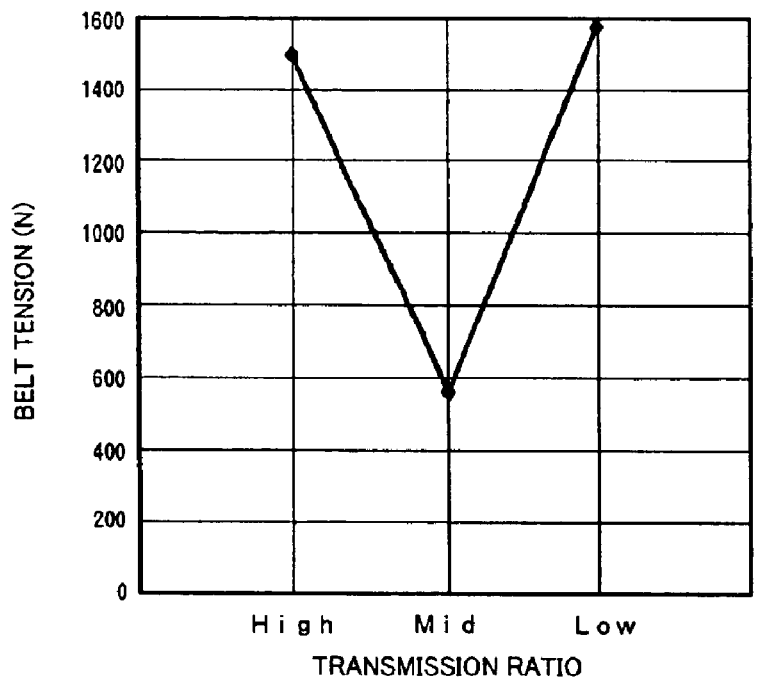
FIG. 12 illustrates the relation between belt tension and the transmission ratio when only a tension spring is used.
Figure 13:
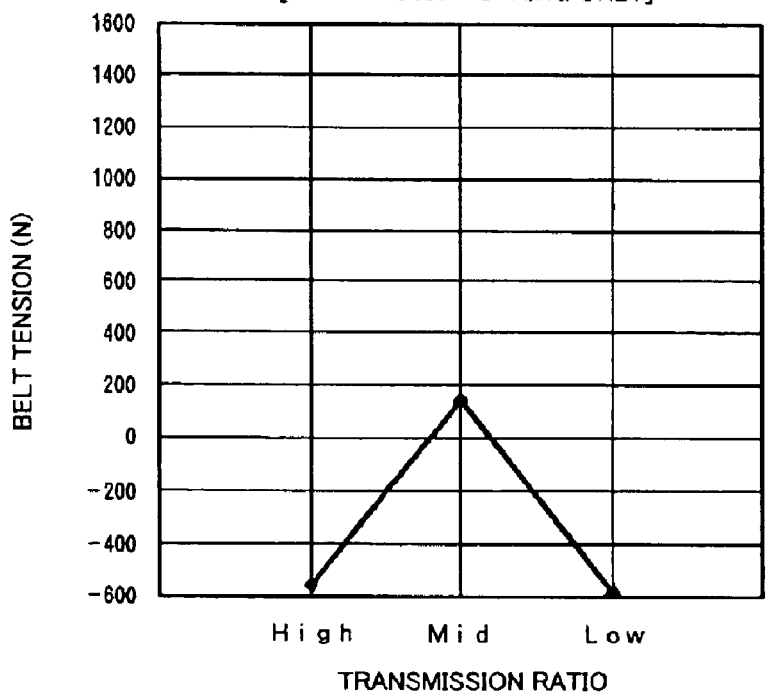
FIG. 13 illustrates the relation between belt tension and the transmission ratio when only a compression spring is used.
Figure 14:
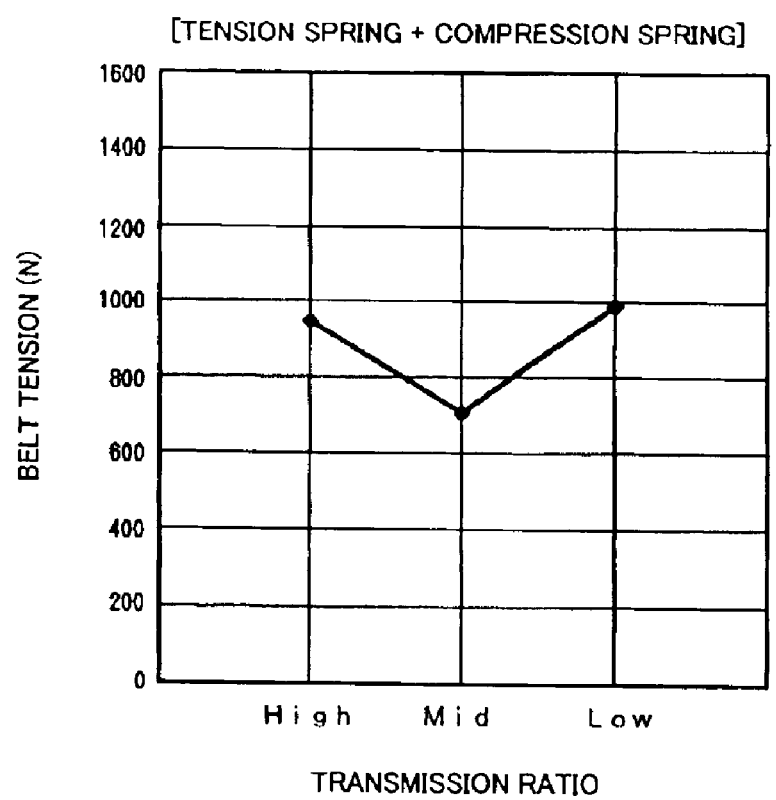
FIG. 14 illustrates the relation between belt tension and the transmission ratio when both of the tension spring and the compression spring are used.

FIGS. 9, 10 and 11 show motions of the pulley unit at the highest transmission ratio, at the middle transmission ratio and at the lowest transmission ratio respectively. FIGS. 12, 13 and 14 show changes of the belt tension in cases when only the tension spring 54 is used, when only the compression spring 57 is used, and when both springs 54 and 57 are used respectively.

As FIGS. 9 and 11 clearly show, the belt 15 has little allowance in its length at the lowest and highest transmission ratios. Hence the amount of distortion of the belt 15 caused by the tension roller 51 is so small that the tension roller 51 is scarcely dropped between the pulleys 11 and 21. On the other hand, at the middle transmission ratio, the belt 15 has an allowance in its length as shown in FIG. 10. Hence the amount of distortion of the belt 15 caused by the tension roller 51 is so large that the tension roller 51 is deeply dropped between the pulleys 11 and 21.

The fulcrum 55 of the tension spring 54 attached to the transmission case is located opposite to the arm 53 beyond the belt 15. Therefore, the spring force of the tension spring 54 acts in such a direction (direction P) that the tension roller 51 inwardly presses the belt 15. As shown in FIG. 12, the belt tension caused by the tension spring 54 at the middle transmission ratio is much smaller than those at the high and the low transmission ratios.

On the other hand, the compression spring 57 is arranged in the vicinity of a straight line L connecting its fulcrum 58 on the transmission case 60 and the rotation fulcrum 53a of the tensioner arm 53. At the high and the low transmission ratios, the coupling point 53c of the compression spring 57 to the arm 53 is located oppositely to the belt 15 beyond the line L, whereas at the middle transmission ratio, it is located closer to the belt 15 than the line L. Therefore, the spring force of the compression spring 57 acts in a direction (direction M) for separating the tension roller 51 from the belt 15 at the high and the low transmission ratios, whereas it acts in the direction (direction P) for pressing the tension roller 51 to the belt 15 at the middle transmission ratio. In other words, as shown in FIG. 13, the belt tension caused by the compression spring 57 works on the plus side at the middle transmission ratio, whereas it works on the minus side at the high and the low transmission ratios. As a result, because the belt tensions caused by the springs 54 and 57 are added up, the difference between the belt tension at the high or the low transmission ratio and that at the middle transmission ratio is reduced so as to attain desired tension characteristics, as shown in FIG. 14. For example, when the added belt tension at the middle transmission ratio is set to the minimum necessary value (e.g., 700N) for preventing slip of the belt 15 on the pulleys, the added belt tension at the high and the low transmission ratios can be suppressed to about 950N to 1000N, so as to prevent reaching an excessive level. Therefore, the belt can be prevented from slipping, and at the same time, be improved in its durability.

The present invention is not restricted to the aforementioned embodiments.

Although the stroke mechanism consists of a ball screw mechanism in the above-described embodiment, it may consist of an ordinary screw mechanism in which a male screw member and a female screw member directly mesh with each other.

Although the tension spring 54 and the compression spring 57 are used in the tensioner device 50 in order to press the slack side of the V belt 15 in the above described embodiment, an actuator such as a motor or a hydraulic cylinder may also be used in addition to or in place of those springs in order to rotationally urge the tensioner arm 53 to press the belt 15. In this case, the belt tension can be controlled to an arbitrary level by controlling the actuator. In case the motor is used as the actuator, the tensioner arm 53 may have a rack formed on the forward end thereof, and the motor may have a pinion gear to drive this rack. In case the hydraulic cylinder is used as the actuator, a piston of the cylinder may be associated with the tensioner arm 53 so as to rotationally urge the arm. In this case, however, the hydraulic cylinder may preferably be provided outside of the transmission case.

In the above described embodiment, the rotational force of the ratio-changing motor 40 is transmitted to the shift input gear 14d attached to the stroke mechanism of the driving pulley 11, and further transmitted from this shift input gear 14d to the shift input gear 22d attached to the stroke mechanism of the driven pulley 21 via the shift-operating gears 46a and 46b fixed to the second shift-operating shaft 46. On the contrary, the rotational force of the motor 40 may be transmitted to the shift input gear 22d of the driven pulley first, further to the shift-operating gears 46a and 46b, and further to the shift input gear 14d of the driving pulley. In addition, the rotational force of the motor 40 may be transmitted to the shift-operating shaft 46 first so that it is further transmitted from the shift-operating gears 46a and 46b of the shaft 46 to the shift input gears 14d and 22d of the driving and driven pulleys 11 and 21 respectively.

FEASIBILITY OF THE RELATED INDUSTRIES

According to the present invention, in a continuously variable transmission using a dry-type belt, the rotational force generated by the ratio-changing motor is transmitted to the stroke mechanisms of both pulleys via the gear mechanism so as to drive those stroke mechanisms synchronously as described above. Hence the transmission ratio can be controlled precisely and stably.

Also, because the belt tension is generated not by the clamping forces of the pulleys, but by a tension-adjusting device for pressing the slack side of the belt, excessive loads are not imposed on the stroke mechanisms. Under this condition, the durability of the stroke mechanisms is improved, and the rotational force of the ratio-changing motor is efficiently converted into the axial movement of the movable sheaves via the gear mechanism together with the stroke mechanisms. Consequently, the shift-response of the transmission ratio can be improved, and the ratio-changing motor can be reduced both in its size and its consumption of electric power.

What is claimed is:
1. A continuously variable transmission, comprising:
 a driving pulley (11) having a fixed sheave (11a) fixed onto a driving shaft (10) and a movable sheave (11b) supported by said driving shaft (10) movably in the axial direction;
 a driven pulley (21) having a fixed sheave (21a) fixed onto a driven shaft (20) and a movable sheave (21b) supported by said driven shaft (20) movably in the axial direction;

an endless belt which is not lubricated with oil wound around said driving pulley (11) and said driven pulley (21);

tension-adjusting device (50) for pressing the slack side of said belt (15) to generate belt tension;

a ratio-changing motor (40);

stroke mechanisms (14, 22) provided on said driving pulley (11) and on said driven pulley (21) respectively for axially shifting said movable sheaves (11b, 21b) depending on inputted rotational force; and a gear mechanism (42, 45, 45a, 45b, 14d, 46, 46a, 46b, 22d) for transmitting rotational force generated by said motor (40) to said stroke mechanisms (14, 22) on the respective pulleys as well as for mechanically interconnecting both of said stroke mechanisms (14, 22) in such a way that said movable sheaves (11b, 21b) of said pulleys can be shifted synchronously and axially in opposite directions to each other in relation to said fixed sheaves (11a, 21a), wherein said gear mechanism (42, 45, 45a, 45b, 14d, 46, 46a, 46b, 22d) comprises:

a shift input gear (14d) provided coaxially on said driving pulley (11);

a shift input gear (22d) provided coaxially on said driven pulley (21); and a shift-operating shaft (46) which has shift-operating gears (46a, 46b) for engaging with said shift input gears (14d, 22d) on the respective pulleys, wherein the lengths of said first and second shift-operating sears (46a, 46b) correspond to Stroke distances of said stroke mechanisms (14, 22) on the driving and driven pulleys, respectively.

2. The continuously variable transmission according to claim 1, wherein said gear mechanism (42, 45, 45a, 45b, 14d, 46, 46a, 46b, 22d) further comprises:

a gear train (42, 45, 45a, 45b) for transmitting the rotational force of said motor (40) to said shift input gear (14d) on said driving pulley, wherein said shift-operating shaft (46) which has said shift-operating gears (46a, 46b) for engaging with said shift input gears (14d, 22d) so as to transmit the rotational force from said shift input gear (14d) on said driving pulley to said shift input gear (22d) on said driven pulley.

3. The continuously variable transmission according to claim 1, wherein said shift-operating shaft (46) is arranged at a position which is inside of a running loop of said belt (15) and which is closer to the tense side of said belt (15) than a straight line S connecting the centers of the axes of said driving pulley (11) and driven pulley (21).

4. The continuously variable transmission according to claim 1, wherein said shift input gears (14d, 22d) on said stroke mechanisms on the driving and driven pulleys are made of resin, whereas said first and second shift-operating gears (46a, 46b) are made of metal.

5. The continuously variable transmission according to claim 1, wherein said gear mechanism (42, 45, 45a, 45b14d, 46, 46a, 46b, 22d) is composed of reversible gears.

6. The continuously variable transmission according to claim 1, wherein each of said stroke mechanisms (14, 22) includes a first screw member (14b, 22b) and a second screw member (14c, 22c) engaging with each other, said second screw member (14c, 22c) is whirl-stopped by a housing (60), said first screw member (14b, 22b) is connected to said movable sheave (11b, 21b) via a first bearing (12, 18) rotatably but not axially movably, and wherein said shift input gear (14d, 22d) is fixed to said first screw member (14b, 22b).

7. The continuously variable transmission according to claim 6, wherein a second bearing (13, 19) for rotatably supporting said driving shaft or driven shaft onto said housing is provided, and wherein the first and second bearings (12, 13, 18, 19) are arranged axially so close to each other in such a way that said first screw member (14b, 22b) and second screw member (14c, 22c) partially overlap with the bearings (12, 13, 18, 19) at the radially outside of the bearings (12, 13, 18, 19) when the width of a groove of said pulley (11, 21) is at its maximum.

8. The continuously variable transmission according to claim 6, wherein said first screw member (14b, 22b) is a female screw member having thread grooves on its inner surface, said second screw member (14c, 22c) is a male screw member having thread grooves on its outer surface, said shift input gear (14d, 22d) and said female screw gear (14b, 22b) are fixed to an outer race of said first bearing (18) via a bracket (17), and wherein a circular space (23) is formed by said female screw gear (14b, 22b) and said bracket (17) in such a way that said male screw member (14c, 22c) is partially inserted into said circular space.

9. The continuously variable transmission according to claim 6, wherein each of said stroke mechanisms (14, 22) is a ball screw mechanism having a plurality of balls (14a, 22a) arranged between said first screw member (14b, 22b) and said second screw member (14c, 22c).

10. The continuously variable transmission according to claim 6, wherein said housing (60) enclosing said driving pulley (11) and said driven pulley (21) has an air intake (67) at a position close to said driving pulley and an air outlet (68) at a position close to said driven pulley, such that the air coming in from said air intake (67) flows along the rotating direction of said driving pulley toward a contact position of said tension-adjusting device (50) with said belt (15), and further flows along the rotating direction of said driven pulley so as to be discharged from said air outlet (68).

11. The continuously variable transmission according to claim 1, wherein said tension-adjusting device (50) comprises:

a tension roller (51) coming into pressure contact with slack side of said belt from outside;

a tensioner arm (53) whose one end is swingably supported on said housing (60) at a position outside of either of said pulleys in radial direction and whose other end has said tension roller (51) attached thereto; and an urging means (54) for swingingly urging said tensioner arm (53) in such direction that said tension roller (51) presses said belt, and wherein said tensioner arm (53), whose length is longer than the diameter of said pulley (11, 21) and whose shape is curved along the outer periphery of said pulley, is arranged such that means for supporting said tension roller travels along an arched locus whose center corresponds to a rotation fulcrum (53a) of said tensioner arm (53) and which passes between said driving pulley and driven pulley.

12. The continuously variable transmission according to claim 11, said tension-adjusting device further comprises a link member (52) whose one end is rotatably coupled to said other end of said tensioner arm 53 and whose other end has said tension roller (51) rotatably attached thereto.

13. The continuously variable transmission according to claim 11, wherein said urging means for swingingly urging said tensioner arm (53) in such direction that said tension roller (51) presses said belt is a tension spring (54) whose one end is hooked onto said tensioner arm (53) at a position closer to said other end thereof, and whose other end extends through a space between axes of the driving and driven pulleys so as to be hooked onto a housing portion (55) located opposite to said tensioner arm (53).

* * * * *